United States Patent
Zhang

(10) Patent No.: US 9,755,771 B2
(45) Date of Patent: Sep. 5, 2017

(54) APPARATUS AND METHOD FOR SENDING VEHICLE BROADCAST INFORMATION

(71) Applicant: Huawei Technologies Co., Ltd., Shenzhen, Guangdong (CN)

(72) Inventor: Lixue Zhang, Shenzhen (CN)

(73) Assignee: Huawei Technologies Co., Ltd., Shenzhen (CN)

(*) Notice: Subject to any disclaimer, the term of this patent is extended or adjusted under 35 U.S.C. 154(b) by 0 days.

(21) Appl. No.: 15/417,787

(22) Filed: Jan. 27, 2017

(65) Prior Publication Data

US 2017/0141861 A1    May 18, 2017

Related U.S. Application Data

(63) Continuation of application No. PCT/CN2014/083432, filed on Jul. 31, 2014.

(51) Int. Cl.
*H04M 3/42* (2006.01)
*H04H 20/55* (2008.01)
(Continued)

(52) U.S. Cl.
CPC .............. *H04H 20/55* (2013.01); *H04W 4/04* (2013.01); *H04W 28/044* (2013.01); *H04W 28/048* (2013.01); *H04W 4/005* (2013.01)

(58) Field of Classification Search
CPC ....... H04W 4/04; H04W 74/08; H04W 4/005; H04W 28/048; H04W 74/0816;
(Continued)

(56) References Cited

U.S. PATENT DOCUMENTS 4,355,360 A * 10/1982 Asano ............... F02D 41/263
                                                        701/101
5,046,130 A * 9/1991 Hall ................. H04B 1/40
                                                        455/345
(Continued)

FOREIGN PATENT DOCUMENTS

CN    102225692 A * 10/2011
CN    103220814 A *  7/2013
(Continued)

OTHER PUBLICATIONS

Inventor: Zhao, Yi, Method and equipment avoiding resource collision, Publication number: CN 103220814 A, (Jul. 24, 2013), All pages, (English translation).*

(Continued)

*Primary Examiner* — Mahendra Patel

(57) ABSTRACT

The present invention provides a method for sending vehicle broadcast information broadcasts a message of first vehicle information at a first resource location of each cycle, where the message of the first vehicle information includes at least driving information of a vehicle that carries first UE; detects, at a second resource location of each cycle, a message of second vehicle information sent by second UE, where the message of the second vehicle information includes at least driving information and a first collision identifier that are of a vehicle that carries the second UE, and the first collision identifier is used to indicate that colliding interference exists at the first resource location of the first UE in each cycle.

16 Claims, 8 Drawing Sheets

A vehicle randomly selects a specific resource location to broadcast its message of vehicle information 10/20 Mhz 100/50 ms

(51) Int. Cl.
*H04W 4/04* (2009.01)
*H04W 28/04* (2009.01)
*H04W 4/00* (2009.01)

(58) Field of Classification Search
CPC ..... H04W 88/04; H04W 84/18; H04W 72/04; H04H 20/55; G08G 1/167; G08G 1/0962; G08G 1/166; B60W 10/11; B60W 50/00; B60W 50/10; B60W 50/14; B60W 10/06; F02D 11/105; F02D 29/02; G05B 15/02; Y02B 60/50; H04L 29/08
USPC .......................... 455/414.2; 342/457; 701/60
See application file for complete search history.

(56) References Cited

U.S. PATENT DOCUMENTS

| | | | | |
|---|---|---|---|---|
| 7,164,117 | B2 * | 1/2007 | Breed | B60R 21/01516 250/208.1 |
| 7,215,092 | B2 * | 5/2007 | Grubba | A63H 19/24 318/268 |
| 7,769,544 | B2 * | 8/2010 | Blesener | B61L 29/28 246/124 |
| 2005/0088318 | A1 | 4/2005 | Liu et al. | |
| 2005/0240319 | A1 * | 10/2005 | Sawada | G08G 1/167 701/1 |
| 2007/0183463 | A1 * | 8/2007 | Cloutot | H04J 3/1682 370/537 |
| 2009/0248270 | A1 * | 10/2009 | Sekiguchi | B60W 10/06 701/96 |
| 2010/0130126 | A1 * | 5/2010 | Takayama | H04B 5/0031 455/41.1 |
| 2011/0125405 | A1 * | 5/2011 | Blesener | B61L 29/28 701/301 |
| 2014/0092735 | A1 | 4/2014 | Lee et al. | |
| 2015/0308270 | A1 * | 10/2015 | Wilmot | G08G 1/166 701/301 |

FOREIGN PATENT DOCUMENTS

| | | | | |
|---|---|---|---|---|
| CN | 103684645 A | * | 3/2014 | |
| CN | WO 2014075556 A1 | * | 5/2014 | ............ H04W 74/08 |
| EP | 2276012 A2 | | 1/2011 | |
| KR | 20050022575 A | * | 3/2005 | |
| WO | WO 02091013 A3 | * | 9/2004 | .............. B61L 29/28 |

OTHER PUBLICATIONS

Inventor(s): Zhao Y, Time slot collision processing method and device, CN 103684645 (A), (Mar. 26, 2014), All pages, (English translation).*

* cited by examiner

APPARATUS AND METHOD FOR SENDING VEHICLE BROADCAST INFORMATION

CROSS-REFERENCE TO RELATED APPLICATIONS

This application is a continuation of International Application No. PCT/CN2014/083432, filed on Jul. 31, 2014, the disclosure of which is hereby incorporated by reference in its entirety.

TECHNICAL FIELD

The present invention relates to the communications field, and in particular, to an apparatus and a method for sending vehicle broadcast information.

BACKGROUND

Internet of Vehicles (IoV) is a new-type management service network that is based on a combination of the Internet and the Internet of Things and that integrates a large amount of software technologies and information service content. Conceptually, the Internet of Vehicles is a network, by using a vehicle as a node and an information source and by using advanced sensing technologies, network technologies, and wireless communications technologies, that processes and shares a large amount of information through a vehicle mobile phone to implement "person-vehicle-road-environment-society" internetworking and achieve purposes of identifying, locating, tracing, supervising, and pushing a service in an intelligent manner. To sum up, service functions of the Internet of Vehicles mainly include aspects such as traffic information, a location service, security, a vehicle condition, infotainment, an insurance service, a rider, and a car service. The security service is the most important part of services of the Internet of Vehicles. How to reduce road traffic accidents, and decrease mortality and property losses by using effective information exchange is a most important issue of research on the Internet of Vehicles. To ensure safe driving of vehicles, different vehicles on a road need to exchange some data with each other. Road and vehicle conditions maybe learned by processing these data, such as a vehicle accident ahead; even an accident may be predicted in advance, and then an alarm is given to a driver to make the driver change a driving policy.

The vehicles driving on the road may predict a possible risk in advance by sending a safety message to surrounding vehicles, and avoid the risk. Safety messages of this type may be classified into two types. One type is an event-triggered message, such as an alarm about a static vehicle ahead, an alarm about a low-speed vehicle ahead, an alarm about an emergency brake, and an alarm about overtaking. When these events happen, a vehicle encountering an event generates a corresponding message and informs surrounding vehicles in a broadcast manner, so as to remind the surrounding vehicles of making corresponding avoidance to avoid a possible risk. The other type of message is a periodic status notification message, such as a cooperative awareness message (CAM). The message of this type requires that a vehicle can broadcast its status information, such as a driving speed of the vehicle, a location of the vehicle, a vehicle model, and an acceleration, at a frequency of 1-10 Hz, that is, a cycle of 100 ms to 1000 ms. The surrounding vehicles perform dynamic analysis according to the received status information to discover a possible collision in advance, instead of informing surrounding vehicles after the collision happens. This is preventive.

However, in the prior art, the CAM generally requires a coverage area of 300-500 meters, and considering a scenario of multiple lanes, a quantity of vehicles in a specific area may be 200-1000 vehicles. If a minimum cycle of 100 ms is considered, CAM of 2-10 vehicles need to be broadcasted per millisecond. Such broadcast density may cause a large quantity of message collisions, and consequently receiving vehicles cannot successfully receive these broadcast messages, thereby reducing driving safety.

SUMMARY

The present invention provides an apparatus and a method for sending vehicle broadcast information, to avoid colliding interference of broadcast messages between vehicles, and improve driving safety.

A first aspect of the present invention provides an apparatus for sending vehicle broadcast information, including:

a sending module, configured to broadcast a message of first vehicle information at a first resource location of each cycle, where the message of the first vehicle information includes at least driving information of a vehicle that carries first UE;

a receiving module, configured to detect, at a second resource location of each cycle, a message of second vehicle information sent by second UE, where the message of the second vehicle information includes at least driving information and a first collision identifier that are of a vehicle that carries the second UE; and the first collision identifier is used to indicate that colliding interference exists at the first resource location of the first UE in each cycle, where the colliding interference is caused between a broadcast message of the first UE and a broadcast message of another UE except the first UE and the second UE; and a processing module, configured to select an idle resource location at the second resource location, and use the selected idle resource location as the first resource location of the first UE in each cycle.

With reference to the first aspect, in a first feasible implementation manner, the first resource location and the second resource location have different time domain locations.

With reference to the first aspect or the first feasible implementation manner of the first aspect, in a second feasible implementation manner, the processing module is specifically configured to: add a non-idle identifier when the receiving module detects, at the second resource location of each cycle, the message of the second vehicle information sent by the second UE, where the non-idle identifier is used to indicate that the second resource location is a non-idle resource location; and/or add an idle identifier when the receiving module does not detect, at the second resource location of each cycle, the message of the second vehicle information sent by the second UE, where the idle identifier is used to indicate that the second resource location is an idle resource location.

With reference to the first aspect or any one of the foregoing feasible implementation manners of the first aspect, in a third feasible implementation manner, the processing module is further configured to: after the receiving module detects, at the second resource location of each cycle, the message of the second vehicle information sent by the second UE, determine whether colliding interference of a broadcast message exists at the second resource location corresponding to the message of the second vehicle information; and if it is determined that the colliding interference of the broadcast message exists at the second resource location, add a second collision identifier to the message of the first vehicle information, and broadcast, at a first resource location of a next cycle, the message of the first vehicle information to which the second collision identifier is added, where the second collision identifier is used to indicate that the colliding interference of the broadcast message exists at the second resource location.

With reference to the first aspect or the third feasible implementation manner of the first aspect, in a fourth feasible implementation manner, the processing module is specifically configured to: when it is determined that the message of the second vehicle information meets the following first condition and second condition, determine that the colliding interference of the broadcast message exists at the second resource location corresponding to the message of the second vehicle information; where the first condition is that the processing module detects that interference at the second resource location exceeds an interference threshold; and the second condition is that the processing module determines that the message of the second vehicle information at the second resource location is successfully decoded, and the message of the second vehicle information at the second resource location cannot be decoded in k cycles after successful decoding, where k is a positive integer.

With reference to the first aspect or the fourth feasible implementation manner of the first aspect, in a fifth feasible implementation manner, the processing module is specifically configured to: when it is determined that the message of the second vehicle information meets any one of the following conditions, determine that the colliding interference of the broadcast message does not exist at the second resource location corresponding to the message of the second vehicle information;

a third condition: the processing module detects that the interference at the second resource location does not exceed the interference threshold;

a fourth condition: the processing module determines that the message of the second vehicle information at the second resource location is not successfully decoded; and a fifth condition: if the processing module determines that the message of the second vehicle information at the second resource location is successfully decoded, the message of the second vehicle information at the second resource location is successfully decoded within at least one cycle of the k cycles after the successful decoding.

With reference to the first aspect or any one of the foregoing feasible implementation manners of the first aspect, in a sixth feasible implementation manner, the message of the first vehicle information further includes an extension indication, where the extension indication is used to instruct the sending module to broadcast the message of the first vehicle info/nation at the first resource location of each cycle and at least one idle resource location.

With reference to the first aspect or any one of the foregoing feasible implementation manners of the first aspect, in a seventh feasible implementation manner, the driving information of the vehicle that carries the first UE includes any one or a combination of the following parameters: location information of the vehicle that carries the first UE, speed information of the vehicle that carries the first UE, direction information of the vehicle that carries the first UE, acceleration information of the vehicle that carries the first UE, or model information of the vehicle that carries the first UE.

A second aspect of the present invention provides an apparatus for sending vehicle broadcast information, including:

a processor, a memory, a bus, and a radio frequency circuit; where the memory is configured to store a computer executable instruction; the processor, the memory, and the radio frequency circuit are connected by using the bus. When the apparatus runs, the processor executes the computer executable instruction stored by the memory; where the radio frequency circuit is configured to broadcast a message of first vehicle information at a first resource location of each cycle, where the message of the first vehicle information includes at least driving information of a vehicle that carries first UE; and the radio frequency circuit is further configured to detect, at a second resource location of each cycle, a message of second vehicle information sent by second UE, where the message of the second vehicle information includes at least driving information and a first collision identifier that are of a vehicle that carries the second UE, and the first collision identifier is used to indicate that colliding interference exists at the first resource location of the first UE in each cycle, where the colliding interference is caused between a broadcast message of the first UE and a broadcast message of another UE except the first UE and the second UE; and the processor is configured to select an idle resource location at the second resource location, and use the selected idle resource location as the first resource location of the first UE in each cycle.

A third aspect of the present invention provides a method for sending vehicle broadcast information, including:

broadcasting, by first user equipment UE, a message of first vehicle information at a first resource location of each cycle, where the message of the first vehicle information includes at least driving information of a vehicle that carries the first UE;

detecting, by the first UE at a second resource location of each cycle, a message of second vehicle information sent by second UE, where the message of the second vehicle information includes at least driving information and a first collision identifier that are of a vehicle that carries the second UE, and the first collision identifier is used to indicate that colliding interference exists at the first resource location of the first UE in each cycle, where the colliding interference is caused between a broadcast message of the first UE and a broadcast message of another UE except the first UE and the second UE; and selecting, by the first UE, an idle resource location at the second resource location, and using the selected idle resource location as the first resource location of the first UE in each cycle.

With reference to the third aspect, in a first feasible implementation manner, the first resource location and the second resource location have different time domain locations.

With reference to the third aspect or the first feasible implementation manner of the third aspect, in a second feasible implementation manner, the detecting, by the first UE at a second resource location of each cycle, a message of second vehicle information sent by second UE includes:

when the first UE detects, at the second resource location of each cycle, the message of the second vehicle information sent by the second UE, adding, by the first UE, a non-idle identifier, where the non-idle identifier is used to indicate that the second resource location is a non-idle resource location; and/or when the first UE does not detect, at the second resource location of each cycle, the message of the second vehicle information sent by the second UE, adding, by the first UE, an idle identifier, where the idle identifier is used to indicate that the second resource location is an idle resource location.

With reference to the third aspect or any one of the foregoing feasible implementation manners of the third aspect, in a third feasible implementation manner, after the detecting, by the first UE at a second resource location of each cycle, a message of second vehicle information sent by second UE, the method further includes:

determining, by the first UE, whether colliding interference of a broadcast message exists at the second resource location corresponding to the message of the second vehicle information; and if it is determined that the colliding interference of the broadcast message exists at the second resource location, adding a second collision identifier to the message of the first vehicle information, and broadcast, at a first resource location of a next cycle, the message of the first vehicle information to which the second collision identifier is added, where the second collision identifier is used to indicate that the colliding interference of the broadcast message exists at the second resource location.

With reference to the third aspect or the third feasible implementation manner of the third aspect, in a fourth feasible implementation manner, the determining, by the first UE, whether colliding interference of a broadcast message exists at the second resource location corresponding to the message of the second vehicle information includes:

when the first UE determines that the message of the second vehicle information meets the following first condition and second condition, determining, by the first UE, that the colliding interference of the broadcast message exists at the second resource location corresponding to the message of the second vehicle information; where the first condition is that the first UE detects that interference at the second resource location exceeds an interference threshold; and the second condition is that the first UE determines that the message of the second vehicle information at the second resource location is successfully decoded, and the message of the second vehicle information at the second resource location cannot be decoded in k cycles after successful decoding, where k is a positive integer.

With reference to the third aspect or the fourth feasible implementation manner of the third aspect, in a fifth feasible implementation manner, the determining, by the first UE, that the colliding interference of the broadcast message does not exist at the second resource location corresponding to the message of the second vehicle information includes:

when the first UE determines that the message of the second vehicle information meets any one of the following conditions, determining, by the first UE, that the colliding interference of the broadcast message does not exist at the second resource location corresponding to the message of the second vehicle information;

a third condition: the first UE detects that the interference at the second resource location does not exceed the interference threshold;

a fourth condition: the first UE determines that the message of the second vehicle information at the second resource location is not successfully decoded; and a fifth condition: if the first UE determines that the message of the second vehicle information at the second resource location is successfully decoded, the message of the second vehicle information at the second resource location is successfully decoded within at least one cycle of the k cycles after the successful decoding.

With reference to the third aspect or any one of the foregoing feasible implementation manners of the third aspect, in a sixth feasible implementation manner, the message of the first vehicle information further includes an extension indication, where the extension indication is used to instruct the first UE to broadcast the message of the first vehicle information at the first resource location of each cycle and at least one idle resource location.

With reference to the third aspect or any one of the foregoing feasible implementation manners of the third aspect, in a seventh feasible implementation manner, the driving information of the vehicle that carries the first UE includes any one or a combination of the following parameters: location information of the vehicle that carries the first UE, speed information of the vehicle that carries the first UE, direction information of the vehicle that carries the first UE, acceleration information of the vehicle that carries the first UE, or model information of the vehicle that carries the first UE.

According to the apparatus and the method for sending vehicle broadcast information provided in the embodiments, a technical solution that UEs carried by adjacent vehicles assist in removing a resource collision is used. Specifically, an apparatus for sending vehicle broadcast information broadcasts a message of first vehicle information at a first resource location of each cycle, where the message of the first vehicle information includes at least driving information of a vehicle that carries first UE; the apparatus for sending vehicle broadcast information detects, at a second resource location of each cycle, a message of second vehicle information sent by second UE, where the message of the second vehicle information includes at least driving information and a first collision identifier that are of a vehicle that carries the second UE, and the first collision identifier is used to indicate that colliding interference exists at the first resource location of the first UE in each cycle, where the colliding interference is caused between a broadcast message of the first UE and a broadcast message of another UE except the first UE and the second UE; and the apparatus for sending vehicle broadcast information selects an idle resource location at the second resource location, and uses the selected idle resource location as the first resource location of the first UE in each cycle.

A technical problem in the prior art is resolved, where the technical problem is that when vehicles in a same area broadcast their own messages of vehicle information, the vehicles cannot learn whether colliding interference occurs between their own messages of vehicle information and messages broadcasted by adjacent vehicles, and consequently broadcast messages cannot be properly transmitted, thereby reducing driving safety.

Therefore, compared with the prior art, according to the apparatus and the method for sending vehicle broadcast information provided in the present invention, a collision identifier can be added to a message that broadcasts vehicle information, so that a vehicle suffering colliding interference selects an idle resource location free of colliding interference to broadcast a message of vehicle information. This reduces a message collision and ensures that a vehicle successfully receives a broadcast message of a surrounding vehicle, thereby improving driving safety.

BRIEF DESCRIPTION OF THE DRAWINGS

To describe the technical solutions in the embodiments of the present invention more clearly, the following briefly describes the accompanying drawings required for describing the embodiments or the prior art. Apparently, the accompanying drawings in the following description show some embodiments of the present invention, and persons of ordinary skill in the art may still derive other drawings from these accompanying drawings without creative efforts.

DETAILED DESCRIPTION

To make the objectives, technical solutions, and advantages of the embodiments of the present invention clearer, the following clearly describes the technical solutions in the embodiments of the present invention with reference to the accompanying drawings in the embodiments of the present invention. Apparently, the described embodiments are some but not all of the embodiments of the present invention. All other embodiments obtained by persons of ordinary skill in the art based on the embodiments of the present invention without creative efforts shall fall within the protection scope of the present invention.

In the prior art, each vehicle of the Internet of Vehicles broadcasts its message of vehicle information in a cycle of 1-10 Hz, such as a CAM. That is, a maximum of 10 vehicles may need to broadcast messages of vehicle information per millisecond. In the prior art, when a vehicle performs broadcasting, the vehicle cannot learn whether colliding interference occurs between a broadcast of a surrounding vehicle and the broadcast of the vehicle, which greatly affects transmission of a broadcast message. Because driving information of the surrounding vehicle cannot be learned in a timely manner, a driving risk increases. According to the embodiments of the present invention, the following provides an apparatus and a method for sending vehicle broadcast information, so as to reduce a message collision. The following describes the apparatus and the method for sending vehicle broadcast information with reference to specific embodiments.

Figure 1:
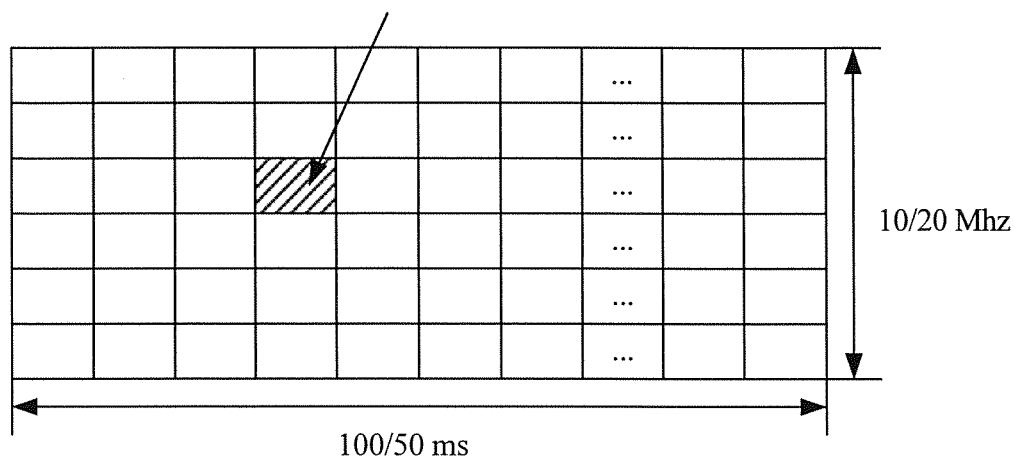
FIG. 1 is a schematic diagram of a physical resource division manner according to an embodiment of the present invention.

FIG. 1 is a schematic diagram of a physical resource division manner according to an embodiment of the present invention. Referring to FIG. 1, in this embodiment, a dedicated radio spectrum resource is used to transmit a message of vehicle information. This resource may be a 10 MHz (or 20 MHz) spectrum on a frequency, and the resource is segmented. For example, the given frequency resource is divided on a timeline at a granularity of 1 ms and on a frequency axis at a granularity of 60 khz to obtain a frequency resource grid shown below.

Each vehicle may select an algorithm based on the resource and select one resource location (grid) to broadcast its message of vehicle information (unless particularly stated, the following uses a CAM as an example). This may ensure that each vehicle has an independent resource for its CAM within a time range of 100 ms, meeting a system requirement.

An initial resource selection algorithm may be simple random selection, that is, available CAM resources are first monitored, and then one CAM resource is randomly selected.

Further, according to a technical capability of existing physical layer design, a data rate of 12 Mbps may be provided in 20 MHz bandwidth, that is, a transmission capability of 1500 bytes per millisecond. If CAM data of 20 users is transmitted per millisecond, each user has an available physical layer transmission resource of 75 bytes, and data of 1000 users may be transmitted within 50 ms. If an overhead of a packet header is calculated per 10 bytes, space of 65 bytes is still left to transmit the data. It can be learned that, this design may theoretically accommodate a thousand users. Certainly, the users may be properly reduced, to increase a data transmission resource allocated to a single user.

Figure 2:
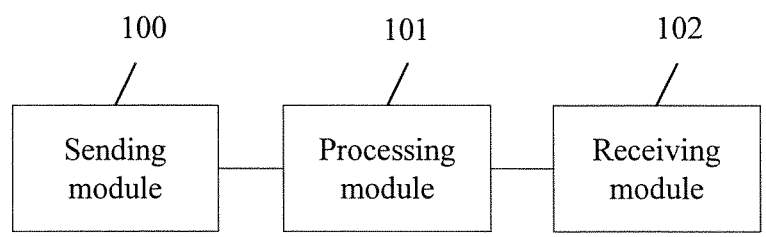
FIG. 2 is a schematic structural diagram of an apparatus for sending vehicle broadcast information according to an embodiment of the present invention.

FIG. 2 is a schematic structural diagram of an apparatus for sending vehicle broadcast information according to an embodiment of the present invention. The apparatus may be user equipment UE disposed on a vehicle. Specifically, the UE may be another handheld mobile terminal, an on board unit (On Board Unit, OBU for short), or the like. Referring to FIG. 2, the apparatus includes a sending module 100, a processing module 101, and a receiving module 102.

The sending module 100 is configured to broadcast a message of first vehicle information at a first resource location of each cycle, where the message of the first vehicle information includes at least driving information of a vehicle that carries first UE.

It should be noted that, the apparatus for sending vehicle broadcast information in this embodiment is the first UE.

A resource location of a corresponding cycle is a physical quantity described in terms of time and frequency, that is, a specific frequency resource in a specific time range, such as a resource with a frequency of 60-120 khz and with duration of 1 ms from 11 ms to 12 ms.

The receiving module 102 is configured to detect, at a second resource location of each cycle, a message of second vehicle information sent by second UE, where the message of the second vehicle information includes at least driving information and a first collision identifier that are of a vehicle that carries the second UE, and the first collision identifier is used to indicate that colliding interference exists at the first resource location of the first UE in each cycle, where the colliding interference is caused between a broadcast message of the first UE and a broadcast message of another UE except the first UE and the second UE.

Figure 3:
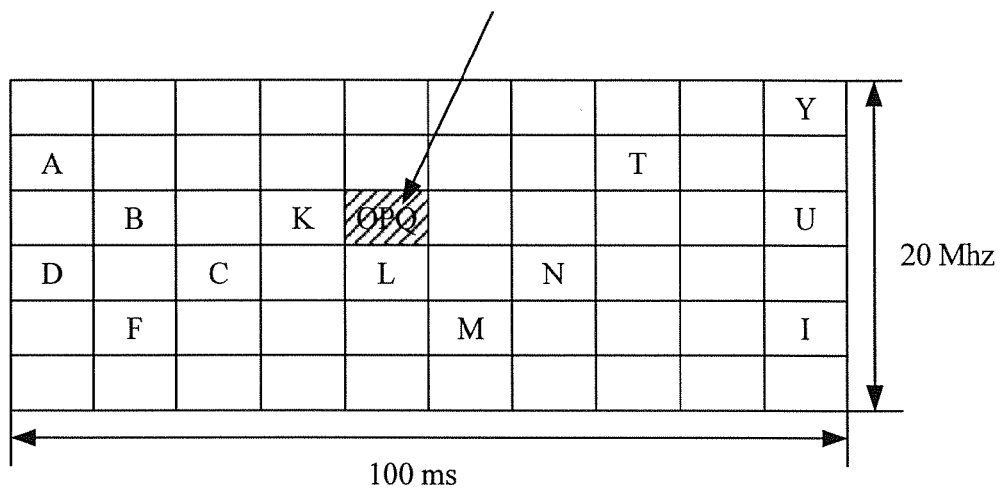
FIG. 3 is a schematic diagram of a physical resource collision according to an embodiment of the present invention.

The second resource location refers to all resources in terms of time except the time of sending a resource. For example, FIG. 3 is a schematic diagram of a physical resource collision according to an embodiment of the present invention. For example, FIG. 3 is used as an example, for vehicle A, the second resource location may include B, F, C, K, and the like, but does not include D, because D and A occupy a transmission resource at a same time domain location. It should be noted that, the another UE refers to third-part UE except the first UE and the second UE. The another UE may be one or more, and the another UE also broadcasts its message of vehicle information at the first resource location, which causes colliding interference with the first UE. Referring to the FIG. 3, for vehicle 0, vehicles P and Q are the another UE.

Specifically, referring to FIG. 3, a collision may occur if multiple UEs select a same resource location. Three vehicles of O, P, and Q shown in FIG. 3 select a same resource location to broadcast respective CAM, and therefore a resource collision occurs among the three vehicles. However, each UE does not receive transmission of this resource location when sending the CAM, and therefore this collision problem is hardly found by using three UEs of O, P, and Q alone. Currently, a radio frequency capability of a wireless communications device requires that UE only sends data or only receives data within a same frequency band, and the UE cannot send the data and receive the data concurrently. Therefore, two UEs of A and D in FIG. 3 cannot receive a CAM sent by the other party.

Specifically, in this embodiment, a manner in which UEs carried by adjacent vehicles assist in removing a resource collision is used to resolve the foregoing message collision problem. Because when sending its CAM, each first UE need to further monitor the CAM (except the CAM sent at the same time, and the CAM sent by the second UE cannot be received when the CAM is sent) sent by the second UE (a quantity of the second UE may be one or more). For example, UEs on four vehicles of A, B, C, and K in FIG. 3 may all detect that a collision occurs at a slash-filled resource location, and in a next cycle (the cycle may be 100 ms or 10 ms), one or more of A, B, C, and K notify in a broadcast manner that colliding interference occurs at this resource location. Correspondingly, O, P, and Q learn, after detecting this notification message, that they select the same resource location as another UE except the first UE and the second UE to perform broadcasting, and use a specific resource reselection algorithm to select another idle resource location to continue broadcasting respective CAM. A simple resource reselection algorithm may be that the UE detects CAM resources to find an idle resource from the CAM resources, and selects one or more of the CAM resources as a transmission resource of the UE when resource reselection is required.

Figure 4:
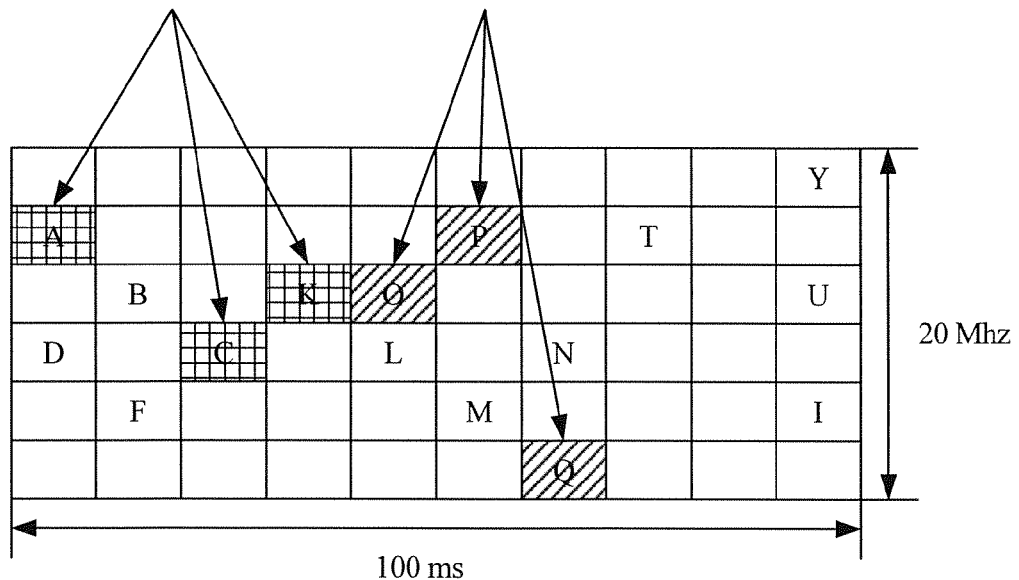
FIG. 4 is a schematic diagram of a physical resource collision and resource reselection according to an embodiment of the present invention.

FIG. 4 is a schematic diagram of a physical resource collision and resource reselection according to an embodiment of the present invention. Referring to FIG. 4, UEs carried by three vehicles of O, P, and Q find many idle resource locations when detecting a periodic CAM, and select these new resource locations in a resource location reselection process.

The processing module 101 is configured to select an idle resource location at the second resource location, and use the selected idle resource location as the first resource location of the first UE in each cycle.

According to the apparatus for sending vehicle broadcast information provided in this embodiment, a sending module broadcasts a message of first vehicle information at a first resource location of each cycle, where the message of the first vehicle information includes at least driving information of a vehicle that carries first UE; a receiving module detects, at a second resource location of each cycle, a message of second vehicle information sent by second UE, where the message of the second vehicle information includes at least driving information and a first collision identifier that are of a vehicle that carries the second UE, and the first collision identifier is used to indicate that colliding interference exists at the first resource location of the first UE in each cycle, where the colliding interference is caused between a broadcast message of the first UE and a broadcast message of another UE except the first UE and the second UE; and a processing module selects an idle resource location at the second resource location, and uses the selected idle resource location as the first resource location of the first UE in each cycle. This reduces a message collision and ensures that a vehicle successfully receives a broadcast message of a surrounding vehicle, thereby improving driving safety.

Preferably, the first resource location and the second resource location have different time domain locations.

It should be noted that, a quantity of the second resource location may be one or more. A difference between the second resource location and the first resource location lies in that the first resource location has a correspondence with the first UE, that is, each first UE corresponds to at least one first resource location. Except the first resource location, other resource locations are all the second resource location with respect to the first UE.

Further, the processing module 101 is specifically configured to add a non-idle identifier when the receiving module 102 detects, at the second resource location of each cycle, the message of the second vehicle information sent by the second UE, where the non-idle identifier is used to indicate that the second resource location is a non-idle resource location; and/or add an idle identifier when the receiving module 102 does not detect, at the second resource location of each cycle, the message of the second vehicle information sent by the second UE, where the idle identifier is used to indicate that the second resource location is an idle resource location.

Further, colliding interference is caused if multiple UEs use a same resource location in a same coverage area to broadcast respective CAM. In this case, another UE except the first UE and the second UE cannot successfully receive any CAM because of interference. How to discover a collision and learn that a receiving failure at a specific resource location is caused by the collision instead of another reason is a problem that needs to be further resolved.

For information about how to determine that the message cannot be properly received because of resource colliding interference, the following gives several feasible manners to resolve the problem.

The processing module 101 is further configured to: after the receiving module 102 detects, at the second resource location of each cycle, the message of the second vehicle information sent by the second UE, determine whether colliding interference of a broadcast message exists at the second resource location corresponding to the message of the second vehicle information; and if it is determined that the colliding interference of the broadcast message exists at the second resource location, add a second collision identifier to the message of the first vehicle information, and broadcast, at a first resource location of a next cycle, the message of the first vehicle information to which the second collision identifier is added, where the second collision identifier is used to indicate that the colliding interference of the broadcast message exists at the second resource location.

It should be noted that, the foregoing is intended only to describe that the processing module 101 has a function of determining whether the colliding interference exists in the message broadcasted by the second UE at the second resource location. Obviously, the second UE or the another UE except the first UE and the second UE also has such a function, and details are not described herein again.

There may be a case in which multiple vehicles concurrently discover a collision occurring at a resource location, and each vehicle randomly chooses whether to send the second collision identifier. For example, a number between 0 and 10 is randomly generated, and if the generated number is greater than 6, the second collision identifier is sent, which can effectively control a quantity of UEs that send a collision identifier, reducing a resource waste.

Further, the processing module 101 is specifically configured to: when it is determined that the message of the second vehicle information meets the following first condition and second condition, determine that the colliding interference of the broadcast message exists at the second resource location corresponding to the message of the second vehicle information.

The first condition is that the processing module 101 detects that interference at the second resource location exceeds an interference threshold.

Specifically, because multiple vehicles concurrently broadcast CAM at this resource location, strong interference is caused. In this case, as long as it is detected that the interference exceeds the threshold, it indicates that a collision occurs.

The second condition is that the processing module 101 determines that the message of the second vehicle information at the second resource location is successfully decoded, and the message of the second vehicle information at the second resource location cannot be decoded in k cycles after successful decoding, where k is a positive integer.

Specifically, an interference reason that needs to be excluded from the second condition is mainly a problem of a receiving vehicle, including interference caused by reasons such as a change of a radio channel, a change of a surrounding environment, and detection sensitivity of a receiver of the vehicle. Therefore, if a CAM broadcast message is successfully decoded at a specific resource location and the CAM cannot be successfully decoded at this resource location within subsequent consecutive K cycles, it is considered that a collision may occur at this resource location or receiving UE leaves a coverage area of sending UE, rather than a problem of a receiver or a problem of a receiving channel. The reason that the receiving UE leaves the coverage area of the sending UE may be excluded provided that determining is performed based on a manner of the first condition. That is, as long as the receiving UE can still detect the interference at the second resource location, it indicates that the receiving UE does not leave the coverage area of the sending UE. K is an empirical value and may be preset according to different systems and user requirements.

Therefore, when the foregoing two conditions are met, it may be determined that mutual interference caused at a resource location is due to broadcasting by multiple vehicles at the same resource location. Although this embodiment provides only the foregoing first condition and second condition, obviously, another feasible determining condition may further be added or replaced to improve accuracy of determining. It should be noted that, the another determining condition shall also fall within the protection scope of the embodiments of the present invention.

Figure 5:
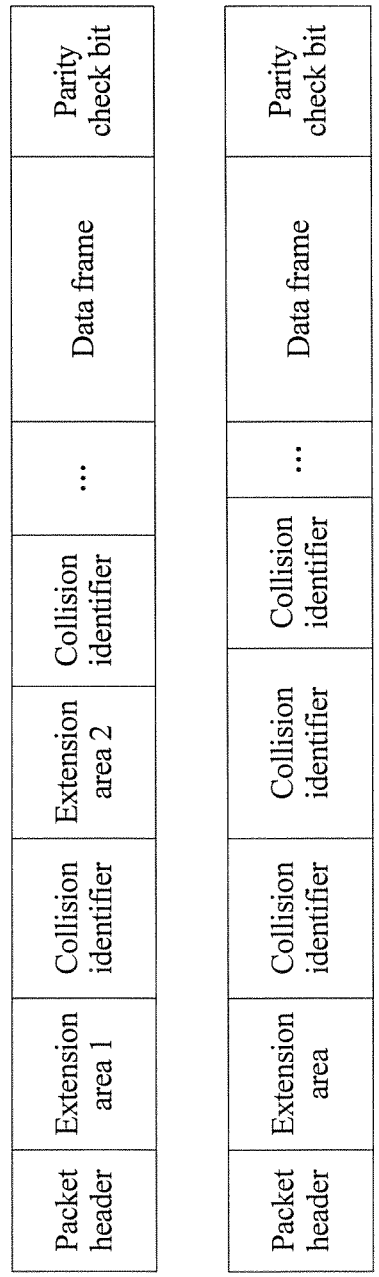
FIG. 5 is a schematic diagram of a resource collision indication frame format according to an embodiment of the present invention.

A vehicle discovering a resource collision needs to assist in removing the collision, and a specific manner is adding a collision identifier of a designated resource location to a CAM broadcasted by the vehicle, where the collision identifier indicates that the colliding interference occurs at this resource location, and one UE may simultaneously indicate that the colliding interference occurs at multiple resource locations. FIG. 5 is a schematic diagram of a resource collision indication frame format according to an embodiment of the present invention. Referring to FIG. 5, a data frame format that may be used is given.

An extension area is reserved in a packet header, as shown in an upper part of FIG. 5. The extension area is represented by 1 bit. If the bit is 1, it indicates that there is a collision identifier behind, and if a quantity of physical resources is 1024, 10 bits are required to indicate any one resource location at which a collision occurs. The collision identifier is followed by another extension area. If the value is 1, it indicates that there is a collision identifier behind, and if the value is 0, it indicates a data frame behind. This manner may indicate multiple collision locations.

Certainly, solution 2 shown in a lower part of FIG. 5 may also be used for design, that is, the extension area definitely indicates how many collision identifiers exist behind. Compared with solution 1, in solution 2, bits of multiple extension areas also need to be carried when no collision needs to be reported, slightly wasting resources. Solution 1 is more resource-saving.

Further, the processing module 101 is further specifically configured to: when it is determined that the message of the second vehicle information meets any one of the following conditions, determine that the colliding interference of the broadcast message does not exist at the second resource location corresponding to the message of the second vehicle information.

A third condition: the processing module 101 detects that the interference at the second resource location does not exceed the interference threshold.

A fourth condition: the processing module 101 determines that the message of the second vehicle information at the second resource location is not successfully decoded.

Specifically, the third condition is corresponding to the foregoing first condition. When the first condition is not met, it indicates that the third condition is met.

A fifth condition: if the processing module 101 determines that the message of the second vehicle information at the second resource location is successfully decoded, the message of the second vehicle information at the second resource location is successfully decoded within at least one cycle of the k cycles after the successful decoding.

Specifically, the fourth condition and the fifth condition are corresponding to the foregoing second condition. When it is determined that the second condition is not met, a case of the fourth condition or a case of the fifth condition may occur.

Preferably, a future vehicle may expect to broadcast more data, but each vehicle can obtain only one resource location to transmit the data, which meets a current requirement but provides an insufficient extension capability. In other words, it is expected in the industry that one UE simultaneously uses 2-3 or more resource locations, and therefore a corresponding extension solution is required.

Preferably, the message of the first vehicle information further includes an extension indication, where the extension indication is used to indicate that the sending module 100 broadcasts the message of the first vehicle information at the first resource location of each cycle and at least one idle resource location.

Figure 6:
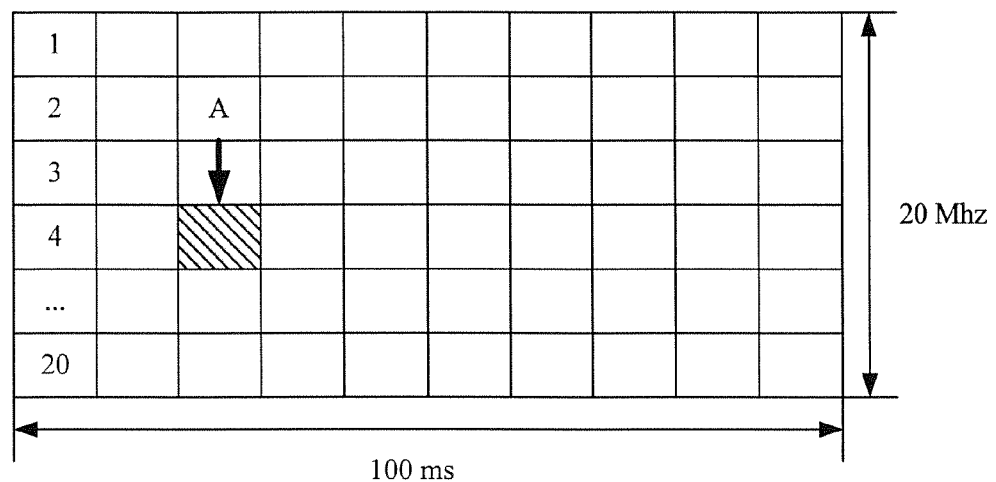
FIG. 6 is a schematic diagram of a resource extension according to an embodiment of the present invention.

Completely using an existing mechanism may be considered. FIG. 6 is a schematic diagram of a resource extension according to an embodiment of the present invention. Referring to FIG. 6, UE carried on vehicle A occupies one resource location, but the UE further needs to use one resource location (a slash-filled resource location), and A adds an indication to the head of vehicle A to inform the UE receiving A that a subsequent slash-filled resource location is still the resource location of A. In addition, the original resource location and the slash-filled resource location may be allowed to be separately decoded, and the data transmitted at the slash-filled resource location is only an extension of the data at the original resource location. A decoding failure does not greatly affect a basic communication requirement.

Figure 7:
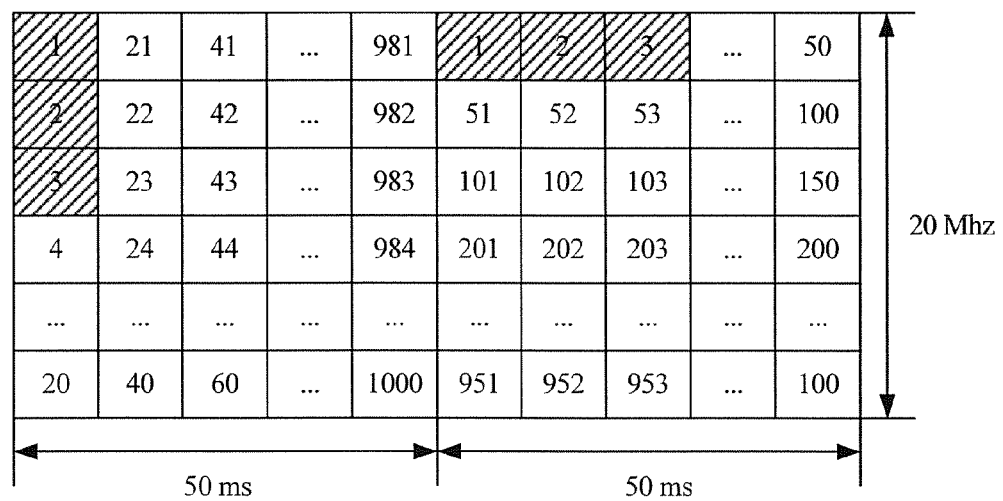
FIG. 7 is a schematic diagram of receiving and sending data according to an embodiment of the present invention.

Preferably, as described above, the UE at one resource location cannot receive a CAM of another UE while sending a CAM, that is, UE 1 in FIG. 6 cannot monitor messages broadcasted by UEs 2, 3, . . . , and 20. Therefore, a new manner needs to be designed to enable the UE to receive all CAM broadcasts. FIG. 7 is a schematic diagram of receiving and sending data according to an embodiment of the present invention. Referring to FIG. 7, a CAM broadcast with a cycle of 100 ms is used as an example. The cycle may be divided into two subcycles of 50 ms in terms of time. In a first subcycle, the UE obtains, by means of contention, a resource location to broadcast a CAM of the UE. In a second subcycle, the UE is mapped to a new resource location to repeatedly broadcast the CAM of the UE, such as using simple row-column mapping or column-row mapping. This process requires that a quantity of rows cannot be less than a quantity of columns, that is, 50 resources are obtained by dividing in terms of time and 20 resources are obtained by dividing in terms of frequency, as shown in the figure. Frequency resources cannot be more than time resources; otherwise, it cannot be ensured that the data overlapped at a previous time is not overlapped at a time of the second subcycle.

In some application scenarios, a vehicle may broadcast some service messages on a traffic channel, and needs to inform surrounding vehicles in a specific manner. One possible manner is adding a service notification to the CAM to inform surrounding vehicles of information about the traffic channel of the vehicle, so that another vehicle jumps to the traffic channel to receive the message. Certainly, some service specific nodes further exist, such as a roadside tollbooth. Some CAM resources may be reserved as service announcement resources of these nodes.

Optionally, the driving information of the vehicle that carries the first UE includes any one or a combination of the following parameters: location information of the vehicle that carries the first UE, speed information of the vehicle that carries the first UE, direction information of the vehicle that carries the first UE, acceleration information of the vehicle that carries the first UE, or model information of the vehicle that carries the first UE. The foregoing driving information is shown only as an example, and this embodiment of the present invention sets no limitation on specific content of vehicle driving information of the UE.

Figure 8:
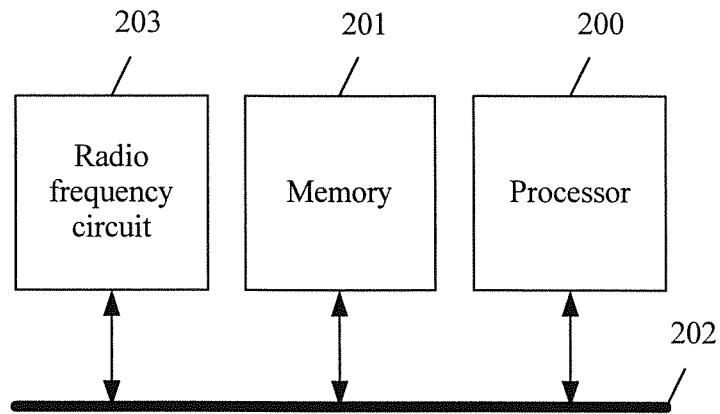
FIG. 8 is a schematic structural diagram of an apparatus for sending vehicle broadcast information according to an embodiment of the present invention.

FIG. 8 is a schematic structural diagram of an apparatus for sending vehicle broadcast information according to an embodiment of the present invention. The apparatus may be user equipment UE disposed on a vehicle. Specifically, the UE may be another handheld mobile terminal, an on board unit OBU, or the like. Referring to FIG. 8, the apparatus includes a processor 200, a memory 201, a bus 202, and a radio frequency circuit 203. The memory 201 is configured to store a computer executable instruction. The processor 200, the memory 201, and the radio frequency circuit 203 are connected by using the bus 202. When the apparatus runs, the processor 200 executes the computer executable instruction stored by the memory 201.

The processor 200 can execute all functions of the processing module 101 shown in FIG. 2, and the radio frequency circuit 203 can execute all functions of the sending module 100 and the receiving module 102 shown in FIG. 2. Obviously, the apparatus for sending vehicle broadcast information shown in FIG. 8 can achieve a technical effect of the embodiment corresponding to FIG. 2, and details are not described herein.

Figure 9:
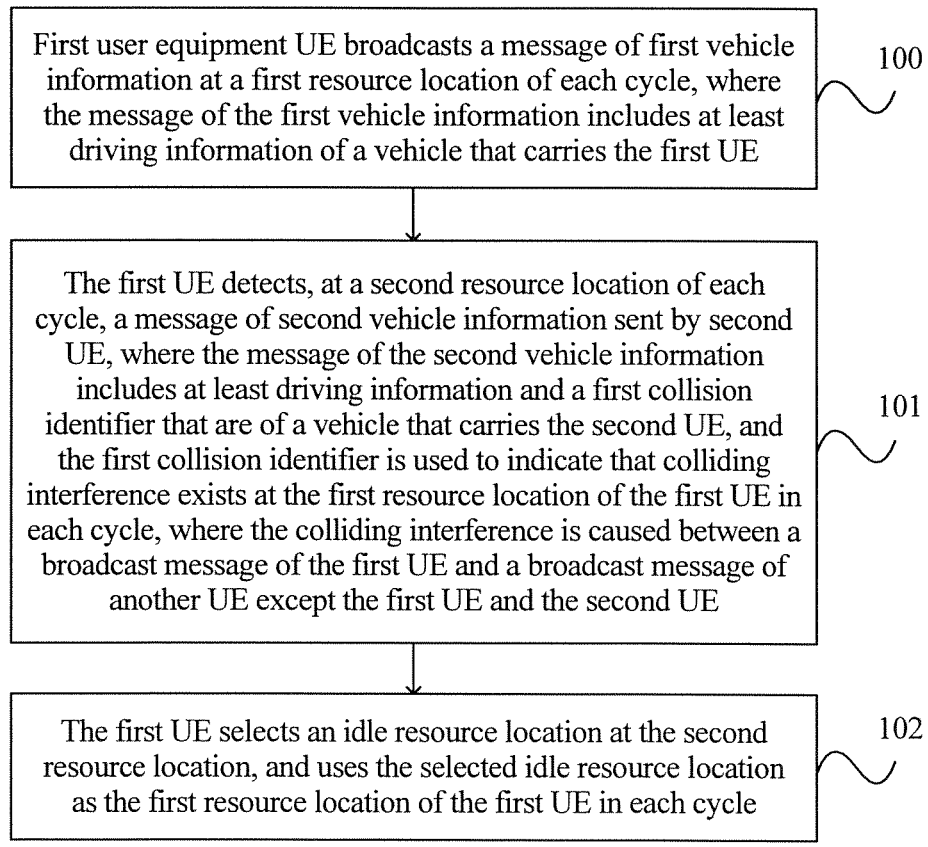
FIG. 9 is a schematic flowchart of a method for sending vehicle broadcast information according to an embodiment of the present invention.

FIG. 9 is a schematic flowchart of a method for sending vehicle broadcast information according to an embodiment of the present invention. The method is executed by user equipment UE disposed on a vehicle. Specifically, the UE may be another handheld mobile terminal, an on board unit OBU, or the like. It should be noted that, the UE may use a structure of the apparatus for sending vehicle broadcast information shown in FIG. 2 or FIG. 8, and execute functions of the embodiment corresponding to FIG. 2 or FIG. 8, achieving a corresponding effect. Referring to FIG. 9, the method includes the following steps.

Step 100. First user equipment UE broadcasts a message of first vehicle information at a first resource location of each cycle, where the message of the first vehicle information includes at least driving information of a vehicle that carries the first UE.

A resource location of a corresponding cycle is a physical quantity described in terms of time and frequency, that is, a specific frequency resource in a specific time range, such as a resource with a frequency of 60-120 khz and with duration of 1 ms from 11 ms to 12 ms.

Step 101. The first UE detects, at a second resource location of each cycle, a message of second vehicle information sent by second UE, where the message of the second vehicle information includes at least driving information and a first collision identifier that are of a vehicle that carries the second UE, and the first collision identifier is used to indicate that colliding interference exists at the first resource location of the first UE in each cycle, where the colliding interference is caused between a broadcast message of the first UE and a broadcast message of another UE except the first UE and the second UE.

The second resource location refers to all resources in terms of time except the time of sending a resource. For a specific example, refer to the foregoing description, and details are not described herein again. It should be noted that, the another UE refers to third-part UE except the first UE and the second UE. The another UE may be one or more, and the another UE also broadcasts its message of vehicle information at the first resource location, which causes colliding interference with the first UE.

Specifically, referring to FIG. 3, a collision may occur if multiple UEs select a same resource location. Three vehicles of O, P, and Q shown in FIG. 3 select a same resource location to broadcast respective CAM, and therefore a resource collision occurs among the three vehicles. However, each UE does not receive transmission of this resource location when sending the CAM, and therefore this collision problem is hardly found by using three UEs of O, P, and Q alone. Currently, a radio frequency capability of a wireless communications device requires that UE only sends data or only receives data within a same frequency band, and the UE cannot send the data and receive the data concurrently. Therefore, two UEs of A and D in FIG. 3 cannot receive a CAM sent by the other party.

Step 102. The first UE selects an idle resource location at the second resource location, and uses the selected idle resource location as the first resource location of the first UE in each cycle.

Specifically, in step 101 and step 102, a manner in which UEs carried by adjacent vehicles assist in removing a resource collision is used to resolve the foregoing message collision problem. Because when sending its CAM, each first UE need to further monitor the CAM (except the CAM sent at the same time, and the CAM sent by the second UE cannot be received when the CAM is sent) sent by the second UE (a quantity of the second UE may be one or more). For example, A, B, C, and K in FIG. 3 may all detect that a collision occurs at a slash-filled resource location, and in a next cycle (the cycle may be 100 ms or 10 ms), one or more of A, B, C, and K notify in a broadcast manner that colliding interference occurs at this resource location. Correspondingly, O, P, and Q learn, after detecting this notification message, that they select the same resource location as another UE except the first UE and the second UE to perform broadcasting, and use a specific resource reselection algorithm to select another idle resource location to continue broadcasting respective CAM. A simple resource reselection algorithm may be that the UE detects CAM resources to find an idle resource from the CAM resources, and selects one or more of the CAM resources as a transmission resource of the UE when resource reselection is required.

Referring to FIG. 4, UEs carried by three vehicles of O, P, and Q find many idle resource locations when detecting a periodic CAM, and select these new resource locations in a resource location reselection process.

According to the method for sending vehicle broadcast information provided in this embodiment, first user equipment UE broadcasts a message of first vehicle information at a first resource location of each cycle, where the message of the first vehicle information includes at least driving information of a vehicle that carries the first UE; the first UE detects, at a second resource location of each cycle, a message of second vehicle information sent by second UE, where the message of the second vehicle information includes at least driving information and a first collision identifier that are of a vehicle that carries the second UE, and the first collision identifier is used to indicate that colliding interference exists at the first resource location of the first UE in each cycle, where the colliding interference is caused between a broadcast message of the first UE and a broadcast message of another UE except the first UE and the second UE; and the first UE selects an idle resource location at the second resource location, and uses the selected idle resource location as the first resource location of the first UE in each cycle. This reduces a message collision and ensures that a vehicle successfully receives a broadcast message of a surrounding vehicle, thereby improving driving safety.

Preferably, the first resource location and the second resource location have different time domain locations.

It should be noted that, a quantity of the second resource location may be one or more. A difference between the second resource location and the first resource location lies in that the first resource location has a correspondence with the first UE, that is, each first UE corresponds to at least one first resource location. Except the first resource location, other resource locations are all the second resource location with respect to the first UE.

Figure 10:
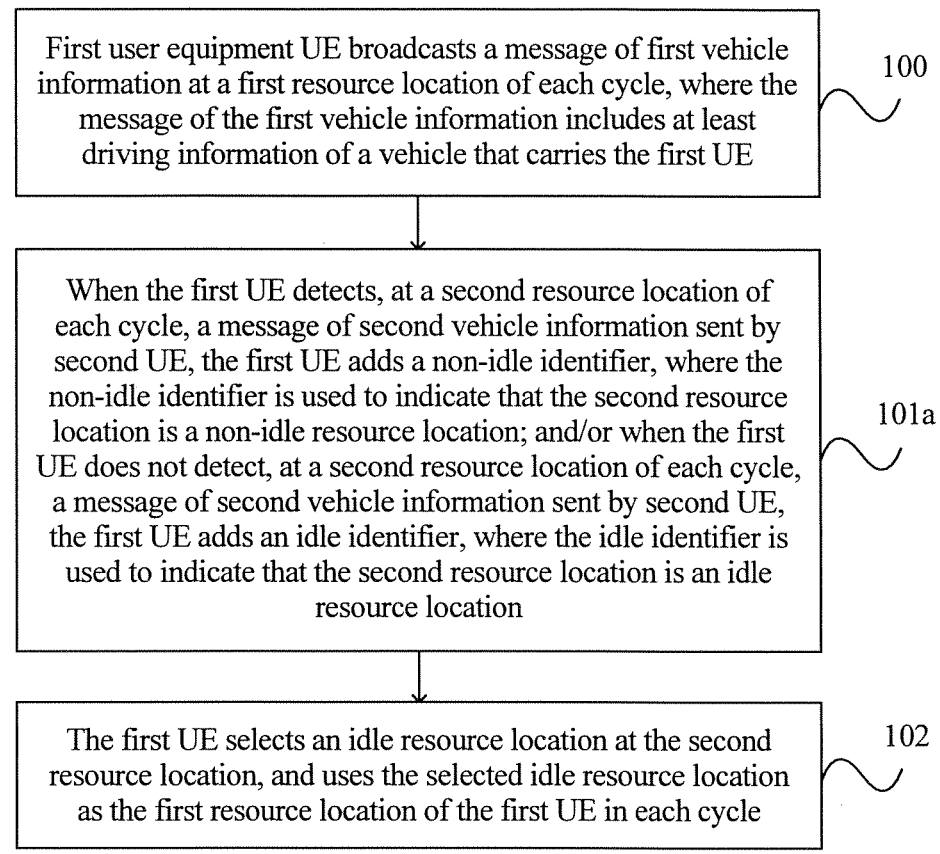
FIG. 10 is a schematic flowchart of a method for sending vehicle broadcast information according to an embodiment of the present invention.

Further, on the basis of FIG. 9, FIG. 10 is a schematic flowchart of a method for sending vehicle broadcast information according to an embodiment of the present invention. Referring to FIG. 10, to identify idle resource locations in a second resource location, so that first UE subsequently selects an idle resource location as the first resource location of the first UE in each cycle, step 101 may have the following feasible manner:

Step 101a. When the first UE detects, at the second resource location of each cycle, a message of second vehicle information sent by second UE, the first UE adds a non-idle identifier, where the non-idle identifier is used to indicate that the second resource location is a non-idle resource location; and/or when the first UE does not detect, at the second resource location of each cycle, the message of the second vehicle information sent by the second UE, the first UE adds an idle identifier, where the idle identifier is used to indicate that the second resource location is an idle resource location.

Further, colliding interference is caused if multiple UEs use a same resource location in a same coverage area to broadcast respective CAM. In this case, another UE except the first UE and the second UE cannot successfully receive any CAM because of interference. How to discover a collision and learn that a receiving failure at a specific resource location is caused by the collision instead of another reason is a problem that needs to be further resolved.

Figure 11:
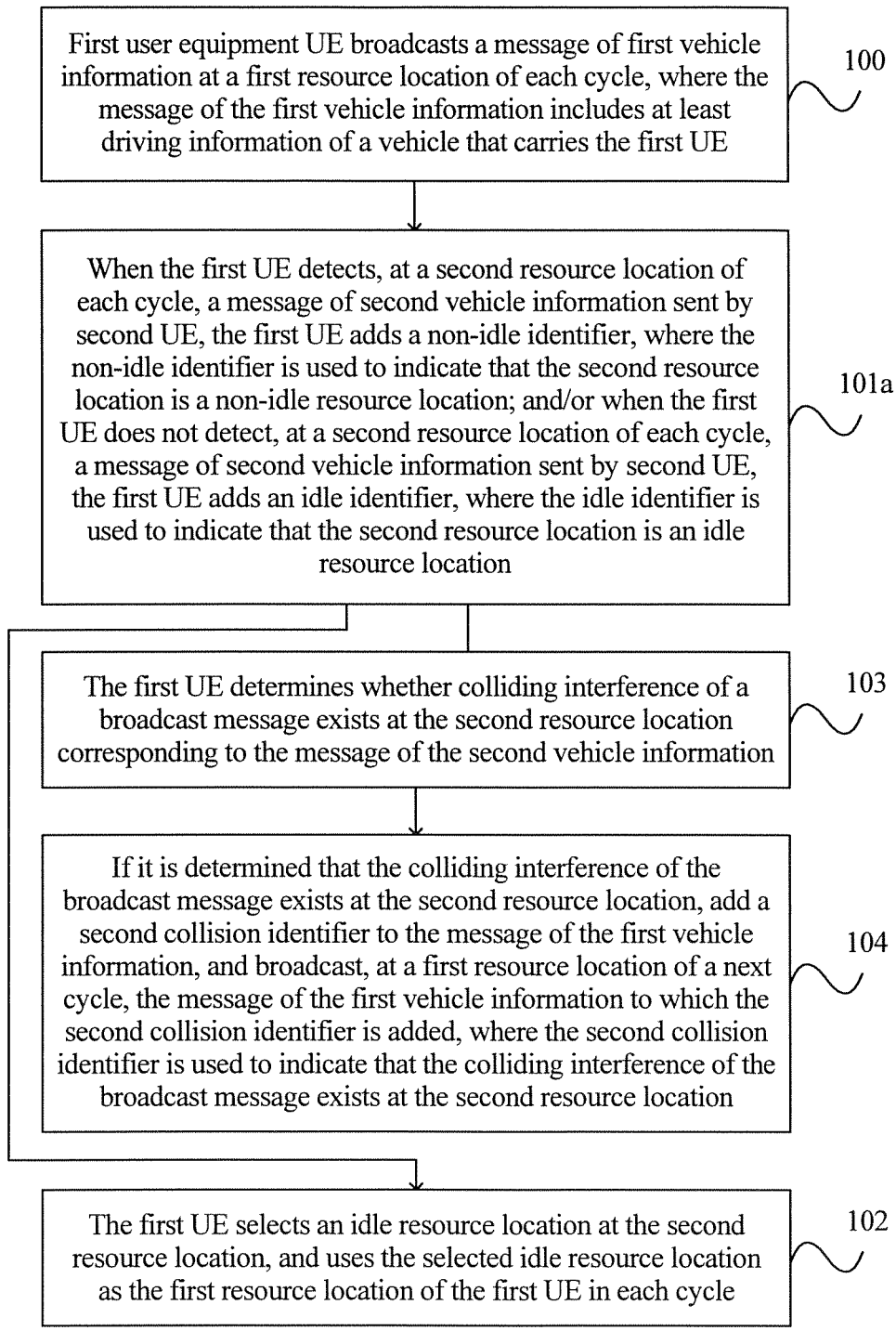
FIG. 11 is a schematic flowchart of a method for sending vehicle broadcast information according to an embodiment of the present invention.

For information about how to determine that the message cannot be properly received because of resource colliding interference, the following gives several feasible manners to resolve the problem. On the basis of FIG. 9 or FIG. 10, FIG. 11 is a schematic flowchart of a method for sending vehicle broadcast information according to an embodiment of the present invention. Referring to FIG. 11, after step 101, the following steps are further included:

Step 103. The first UE determines whether colliding interference of a broadcast message exists at the second resource location corresponding to the message of the second vehicle information.

Step 104. If it is determined that the colliding interference of the broadcast message exists at the second resource location, add a second collision identifier to the message of the first vehicle information, and broadcast, at a first resource location of a next cycle, the message of the first vehicle information to which the second collision identifier is added, where the second collision identifier is used to indicate that the colliding interference of the broadcast message exists at the second resource location.

It should be noted that, step 103 and step 104 are intended only to describe that the first UE has a function of determining whether the colliding interference exists in the message broadcasted by the second UE at the second resource location. Obviously, the second UE or the another UE except the first UE and the second UE also has such a function, and details are not described herein again.

There may be a case in which multiple vehicles concurrently discover a collision occurring at a location, and each vehicle randomly chooses whether to send the second collision identifier. For example, a number between 0 and 10 is randomly generated, and if the generated number is greater than 6, the second collision identifier is sent, which can effectively control a quantity of UEs that send a collision identifier, reducing a resource waste.

It should be noted that, what is shown in FIG. 11 is based on FIG. 10. Obviously, step 103 and step 104 shown in FIG. 11 may also be implemented based on FIG. 9.

Specifically, for step 103, a feasible implementation manner is:

Step 103a. When the first UE determines that the message of the second vehicle information meets the following first condition and second condition, the first UE determines that the colliding interference of the broadcast message exists at the second resource location corresponding to the message of the second vehicle information.

The first condition is that the first UE detects that interference at the second resource location exceeds an interference threshold.

Specifically, because multiple vehicles concurrently broadcast CAM at this resource location, strong interference is caused. In this case, as long as it is detected that the interference exceeds the threshold, it indicates that a collision occurs.

The second condition is that the first UE determines that the message of the second vehicle information at the second resource location is successfully decoded, and the message of the second vehicle information at the second resource location cannot be decoded in k cycles after successful decoding, where k is a positive integer.

Specifically, an interference reason that needs to be excluded from the second condition is mainly a problem of a receiving vehicle, including interference caused by reasons such as a change of a radio channel, a change of a surrounding environment, and detection sensitivity of a receiver of the vehicle. Therefore, if a CAM broadcast message is successfully decoded at a specific resource location and the CAM cannot be successfully decoded at this resource location within subsequent consecutive K cycles, it is considered that a collision may occur at this resource location or receiving UE leaves a coverage area of sending UE, rather than a problem of a receiver or a problem of a receiving channel. The reason that the receiving UE leaves the coverage area of the sending UE may be excluded provided that determining is performed based on a manner of the first condition. That is, as long as the receiving UE can still detect the interference at this non-corresponding resource location, it indicates that the receiving UE does not leave the coverage area of the sending UE. K is an empirical value and may be preset according to different systems and user requirements.

Therefore, when the foregoing two conditions are met, it may be determined that mutual interference caused at a resource location is due to broadcasting by multiple vehicles at the same resource location. Although this embodiment provides only the foregoing first condition and second condition, obviously, another feasible determining condition may further be added or replaced to improve accuracy of determining. It should be noted that, the another determining condition shall also fall within the protection scope of the embodiments of the present invention.

A vehicle discovering a resource collision needs to assist in removing the collision, and a specific manner is adding a collision identifier of a designated resource location to a CAM broadcasted by the vehicle, where the collision identifier indicates that the colliding interference occurs at this resource location, and one UE may simultaneously indicate that the colliding interference occurs at multiple resource locations. For a data frame format that may be used, refer to FIG. 5 and the foregoing embodiment corresponding to FIG. 5.

Further, the determining, by the UE, that the colliding interference of the broadcast message does not exist at the second resource location corresponding to the message of the second vehicle information may be implemented in the following manner:

When the first UE determines that the message of the second vehicle information meets any one of the following conditions, the first UE determines that the colliding interference of the broadcast message does not exist at the second resource location corresponding to the message of the second vehicle information.

A third condition: the first UE detects that the interference at the second resource location does not exceed the interference threshold.

Specifically, the third condition is corresponding to the foregoing first condition. When the first condition is not met, it indicates that the third condition is met.

A fourth condition: the first UE determines that the message of the second vehicle information at the second resource location is not successfully decoded.

A fifth condition: if the first UE determines that the message of the second vehicle information at the second resource location is successfully decoded, the message of the second vehicle information at the second resource location is successfully decoded within at least one cycle of the k cycles after the successful decoding.

Specifically, the fourth condition and the fifth condition are corresponding to the foregoing second condition. When it is determined that the second condition is not met, a case of the fourth condition or a case of the fifth condition may occur.

Preferably, a future vehicle may expect to broadcast more data, but each vehicle can obtain only one resource location to transmit the data, which meets a current requirement but provides an insufficient extension capability. In other words, it is expected in the industry that one UE simultaneously uses 2-3 or more resource locations, and therefore a corresponding extension solution is required.

A feasible manner is that the message of the first vehicle information further includes an extension indication, where the extension indication is used to instruct the first UE to broadcast the message of the first vehicle information at the first resource location of each cycle and at least one idle resource location.

Completely using an existing mechanism may be considered. Referring to FIG. 6, UE carried on vehicle A occupies one resource location, but the UE further needs to use one resource location (a slash-filled resource location), and A adds an indication to the head of vehicle A to inform the UE receiving A that a subsequent slash-filled resource location is still the resource location of A. In addition, the original resource location and the slash-filled resource location may be allowed to be separately decoded, and the data transmitted at the slash-filled resource location is only an extension of the data at the original resource location. A decoding failure does not greatly affect a basic communication requirement.

Preferably, as described above, the UE at one resource location cannot receive a CAM of another UE while sending a CAM, that is, UE 1 in FIG. 6 cannot monitor messages broadcasted by UEs 2, 3, . . . , and 20. Therefore, a new manner needs to be designed to enable the UE to receive all CAM broadcasts. FIG. 7 is a schematic diagram of receiving and sending data according to an embodiment of the present invention. Referring to FIG. 7, a CAM broadcast with a cycle of 100 ms is used as an example. The cycle may be divided into two subcycles of 50 ms in terms of time. In a first subcycle, the UE obtains, by means of contention, a resource location to broadcast a CAM of the UE. In a second subcycle, the UE is mapped to a new resource location to repeatedly broadcast the CAM of the UE, such as using simple row-column mapping or column-row mapping. This process requires that a quantity of rows cannot be less than a quantity of columns, that is, 50 resources are obtained by dividing in terms of time and 20 resources are obtained by dividing in terms of frequency, as shown in the figure. Frequency resources cannot be more than time resources; otherwise, it cannot be ensured that the data overlapped at a previous time is not overlapped at a time of the second subcycle.

In some application scenarios, a vehicle may broadcast some service messages on a traffic channel, and needs to inform surrounding vehicles in a specific manner. One possible manner is adding a service notification to the CAM to inform surrounding vehicles of information about the traffic channel of the vehicle, so that another vehicle jumps to the traffic channel to receive the message. Certainly, some service specific nodes further exist, such as a roadside tollbooth. Some CAM resources may be reserved as service announcement resources of these nodes.

Figure 12:
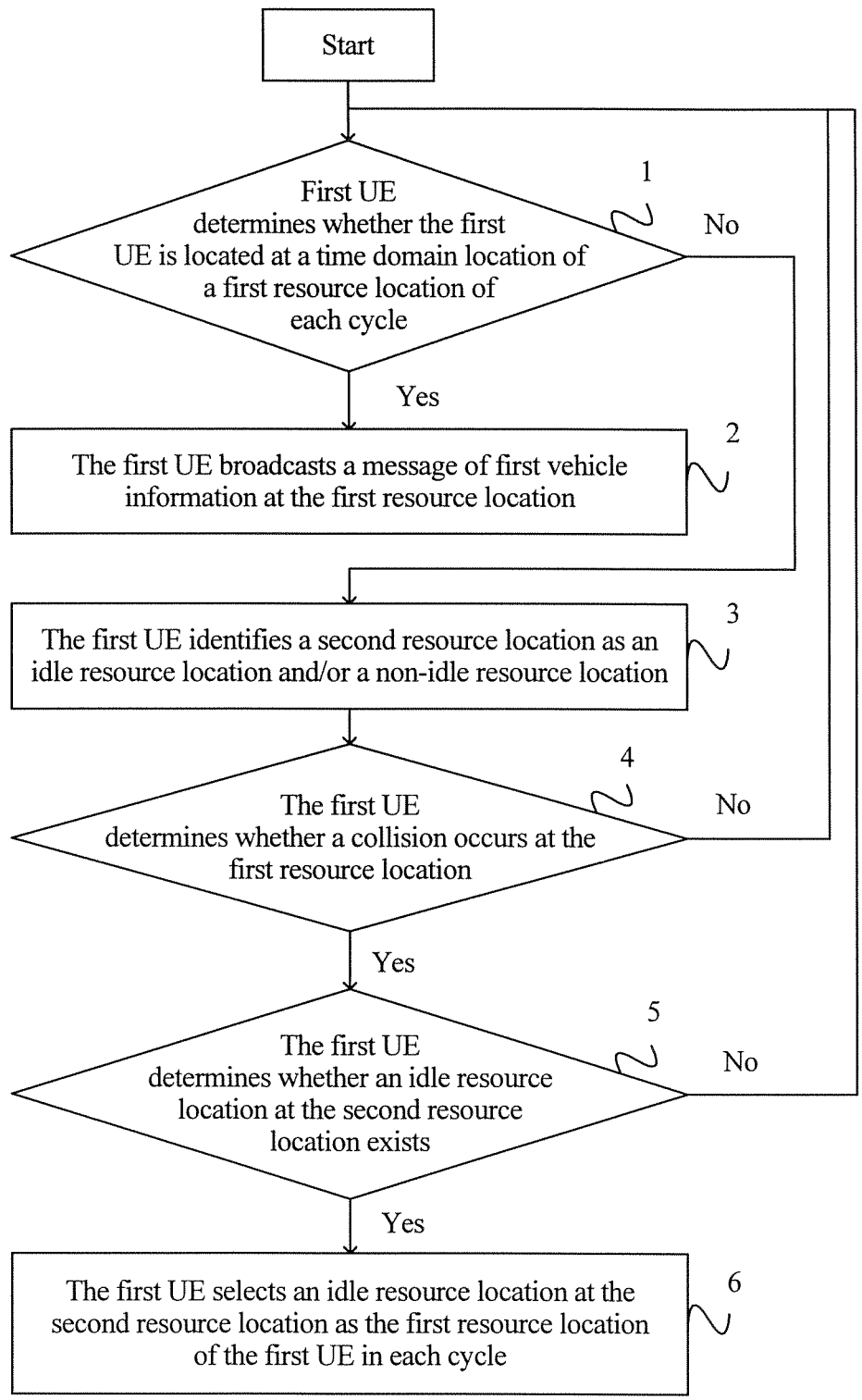
FIG. 12 is a schematic flowchart of a CAM broadcast of a message of vehicle information and resource location selection according to an embodiment of the present invention.

FIG. 12 is a schematic flowchart of a CAM broadcast of a message of vehicle information and resource location selection according to an embodiment of the present invention. Referring to FIG. 12, this flowchart includes the following steps.

Step 1. First UE determines whether the first UE is located at a time domain location of the first resource location of each cycle.

Specifically, if the first UE is located at the time domain location, step 2 is performed; otherwise, step 3 is performed.

Step 2. The first UE broadcasts a message of first vehicle information at the first resource location.

Step 3. The first UE identifies a second resource location as an idle resource location and/or a non-idle resource location.

Specifically, in an identifying process, the first UE may further determine whether colliding interference of a broadcast message exists at a second resource location of any second UE according to determining methods of the foregoing first condition to fifth condition. If the colliding interference exists, the first UE adds a second collision identifier to the message of the first vehicle information, so as to indicate that the colliding interference of the broadcast message exists at the second resource location for a corresponding second UE, so that the second UE selects another idle resource location as a second resource location.

Step 4. The first UE determines whether a collision occurs at the first resource location.

Specifically, the first UE detects whether a first collision identifier exists in the message of the second vehicle information sent by the second UE, and if the first collision identifier exists, it indicates that a collision occurs at the first resource location.

Specifically, if the collision occurs, step 5 is performed; otherwise, return to step 1.

Further, for step 4, a feasible implementation manner is that a collision identifier is added for the first resource location, where the identifier maybe set to be true or false. When it is determined, based on the foregoing collision determining methods, that the collision occurs at the first resource location, the collision identifier of the first resource location is detected. If the collision identifier is true, step 5 is directly performed, and if the collision identifier is false, the identifier is set to be true, and then step 5 is performed.

Step 5. The first UE determines whether an idle resource location at the second resource location exists.

Specifically, if the idle resource location exists, step 6 is performed; otherwise, return to step 1.

Step 6. The first UE selects the idle resource location at the second resource location as the first resource location of the first UE in each cycle.

Specifically, because of units of each time domain location, the first UE either broadcasts its CAM, or receives a CAM sent by second UE carried by another vehicle. If a time domain location of a resource location corresponding to each cycle that belongs to the first UE arrives, the first UE broadcasts its CAM at the time domain location; otherwise, the first UE monitors the CAM broadcasted by the second UE. In addition, the first UE further needs to check whether a collision occurs at a resource location occupied by the first UE. For a check method, refer to the foregoing description. That is, after the second UE discovers that the collision occurs at this resource location L, the second UE adds a collision identifier of a collision at the resource location L to the CAM of the second UE, so that the first UE that selects the resource location L can learn, by receiving the CAM sent by the second UE, that the collision occurs at this resource location L for the first UE. After discovering a collision of the first UE, the first UE searches for an available idle resource location in each time unit. If M idle resource locations are found in a specific time unit, where M is greater than or equal to 1, the first UE may randomly select an idle resource location K from the M idle resource locations to broadcast the CAM of the first UE.

Further, based on a feasible implementation manner in step 4, after step 6 is completed, optionally, the collision identifier of the first resource location may be set to be false.

It should be noted that, the driving information of the vehicle that carries the first UE in the foregoing description includes any one or a combination of the following parameters: location information of the vehicle that carries the first UE, speed information of the vehicle that carries the first UE, direction information of the vehicle that carries the first UE, acceleration information of the vehicle that carries the first UE, or model information of the vehicle that carries the first UE. The foregoing driving information is shown only as an example, and this embodiment of the present invention sets no limitation on specific content of vehicle driving information of the UE.

Persons of ordinary skill in the art may understand that all or some of the steps of the method embodiments may be implemented by a program instructing relevant hardware. The program may be stored in a computer readable storage medium. When the program runs, the steps of the method embodiments are performed. The foregoing storage medium includes: any medium that can store program code, such as a ROM, a RAM, a magnetic disk, or an optical disc.

Finally, it should be noted that the foregoing embodiments are merely intended for describing the technical solutions of the present invention, but not for limiting the present invention. Although the present invention is described in detail with reference to the foregoing embodiments, persons of ordinary skill in the art should understand that they may still make modifications to the technical solutions described in the foregoing embodiments or make equivalent replacements to some or all technical features thereof, without departing from the scope of the technical solutions of the embodiments of the present invention.

What is claimed is:

1. An apparatus for sending vehicle broadcast information, comprising:
   a transmitter, configured to broadcast a message of first vehicle information at a first resource location of each cycle, wherein the message of the first vehicle information comprises at least driving information of a vehicle that carries a first user equipment (UE);
a receiver, configured to detect, at a second resource location of each cycle, a message of second vehicle information sent by a second UE, wherein the message of the second vehicle information comprises at least driving information and a first collision identifier that are of a vehicle that carries the second UE, and the first collision identifier is used to indicate that colliding interference exists at the first resource location of the first UE in each cycle, wherein the colliding interference is caused between a broadcast message of the first UE and a broadcast message of another UE except the first UE and the second UE; and
a processor, configured to select an idle resource location at the second resource location, and use the selected idle resource location as the first resource location of the first UE in each cycle.

2. The apparatus according to claim 1, wherein the first resource location and the second resource location have different time domain locations.

3. The apparatus according to claim 1, wherein the processor is configured to:
add a non-idle identifier when the receiver detects, at the second resource location of each cycle, the message of the second vehicle information sent by the second UE, wherein the non-idle identifier is used to indicate that the second resource location is a non-idle resource location; and/or
add an idle identifier when the receiver does not detect, at the second resource location of each cycle, the message of the second vehicle information sent by the second UE, wherein the idle identifier is used to indicate that the second resource location is an idle resource location.

4. The apparatus according to claim 1, wherein the processor is further configured to:
after the receiver detects, at the second resource location of each cycle, the message of the second vehicle information sent by the second UE, determine whether colliding interference of a broadcast message exists at the second resource location corresponding to the message of the second vehicle information; and
when the colliding interference of the broadcast message exists at the second resource location, add a second collision identifier to the message of the first vehicle information, and broadcast, at a first resource location of a next cycle, the message of the first vehicle information to which the second collision identifier is added, wherein the second collision identifier is used to indicate that the colliding interference of the broadcast message exists at the second resource location.

5. The apparatus according to claim 4, wherein the processor is configured to:
when it is determined that the message of the second vehicle information meets the following first condition and second condition:
the first condition is that the processor detects that interference at the second resource location exceeds an interference threshold, and
the second condition is that the processor determines that the message of the second vehicle information at the second resource location is successfully decoded, and the message of the second vehicle information at the second resource location cannot be decoded ink cycles after successful decoding, wherein k is a positive integer; then
determine that the colliding interference of the broadcast message exists at the second resource location corresponding to the message of the second vehicle information.

6. The apparatus according to claim 5, wherein the processor is configured to:
when it is determined that the message of the second vehicle information meets any one of the following conditions:
a third condition: the processor detects that the interference at the second resource location does not exceed the interference threshold,
a fourth condition: the processor determines that the message of the second vehicle information at the second resource location is not successfully decoded, or
a fifth condition: if the processor determines that the message of the second vehicle information at the second resource location is successfully decoded, the message of the second vehicle information at the second resource location is successfully decoded within at least one cycle of the k cycles after the successful decoding; then determine that the colliding interference of the broadcast message does not exist at the second resource location corresponding to the message of the second vehicle information.

7. The apparatus according to claim 1, wherein the message of the first vehicle information further comprises an extension indication, and the extension indication is used to instruct the transmitter to broadcast the message of the first vehicle information at the first resource location of each cycle and at least one idle resource location.

8. The apparatus according to claim 1, wherein the driving information of the vehicle that carries the first UE comprises any one or a combination of the following parameters:
location information of the vehicle that carries the first UE, speed information of the vehicle that carries the first UE, direction information of the vehicle that carries the first UE, acceleration information of the vehicle that carries the first UE, or model information of the vehicle that carries the first UE.

9. A method for sending vehicle broadcast information, the method comprising:
broadcasting, by a first user equipment (UE), a message of first vehicle information at a first resource location of each cycle, wherein the message of the first vehicle information comprises at least driving information of a vehicle that carries the first UE;
detecting, by the first UE at a second resource location of each cycle, a message of second vehicle information sent by a second UE, wherein the message of the second vehicle information comprises at least driving information and a first collision identifier that are of a vehicle that carries the second UE, and the first collision identifier is used to indicate that colliding interference exists at the first resource location of the first UE in each cycle, wherein the colliding interference is caused between a broadcast message of the first UE and a broadcast message of another UE except the first UE and the second UE; and
selecting, by the first UE, an idle resource location at the second resource location, and using the selected idle resource location as the first resource location of the first UE in each cycle.

10. The method according to claim 9, wherein the first resource location and the second resource location have different time domain locations.

11. The method according to claim 9, wherein detecting, by the first UE at the second resource location of each cycle, the message of second vehicle information sent by the second UE comprises:
when the first UE detects, at the second resource location of each cycle, the message of the second vehicle information sent by the second UE, adding, by the first UE, a non-idle identifier, wherein the non-idle identifier is used to indicate that the second resource location is a non-idle resource location; and/or
when the first UE does not detect, at the second resource location of each cycle, the message of the second vehicle information sent by the second UE, adding, by the first UE, an idle identifier, wherein the idle identifier is used to indicate that the second resource location is an idle resource location.

12. The method according to claim 9, after detecting, by the first UE at the second resource location of each cycle, the message of second vehicle information sent by the second UE, further comprising:
determining, by the first UE, whether colliding interference of a broadcast message exists at the second resource location corresponding to the message of the second vehicle information; and
when it is determined that the colliding interference of the broadcast message exists at the second resource location, adding a second collision identifier to the message of the first vehicle information, and broadcast, at a first resource location of a next cycle, the message of the first vehicle information to which the second collision identifier is added, wherein the second collision identifier is used to indicate that the colliding interference of the broadcast message exists at the second resource location.

13. The method according to claim 12, wherein determining, by the first UE, whether colliding interference of the broadcast message exists at the second resource location corresponding to the message of the second vehicle information comprises:
when the first UE determines that the message of the second vehicle information meets the following first condition and second condition:
the first condition is that the first UE detects that interference at the second resource location exceeds an interference threshold, and
the second condition is that the first UE determines that the message of the second vehicle information at the second resource location is successfully decoded, and the message of the second vehicle information at the second resource location cannot be decoded ink cycles after successful decoding, wherein k is a positive integer; then
determining, by the first UE, that the colliding interference of the broadcast message exists at the second resource location corresponding to the message of the second vehicle information.

14. The method according to claim 13, wherein determining, by the first UE, that the colliding interference of the broadcast message does not exist at the second resource location corresponding to the message of the second vehicle information comprises:
when the first UE determines that the message of the second vehicle information meets any one of the following conditions:
a third condition: the first UE detects that the interference at the second resource location does not exceed the interference threshold,
a fourth condition: the first UE determines that the message of the second vehicle information at the second resource location is not successfully decoded, or
a fifth condition: if the first UE determines that the message of the second vehicle information at the second resource location is successfully decoded, the message of the second vehicle information at the second resource location is successfully decoded within at least one cycle of the k cycles after the successful decoding; then
determining, by the first UE, that the colliding interference of the broadcast message does not exist at the second resource location corresponding to the message of the second vehicle information.

15. The method according to claim 9, wherein the message of the first vehicle information further comprises an extension indication, and the extension indication is used to instruct the first UE to broadcast the message of the first vehicle information at the first resource location of each cycle and at least one idle resource location.

16. The method according to claim 9, wherein the driving information of the vehicle that carries the first UE comprises any one or a combination of the following parameters:
location information of the vehicle that carries the first UE, speed information of the vehicle that carries the first UE, direction information of the vehicle that carries the first UE, acceleration information of the vehicle that carries the first UE, or model information of the vehicle that carries the first UE.

* * * * *